US011794407B2

(12) United States Patent
Anegawa et al.

(10) Patent No.: US 11,794,407 B2
(45) Date of Patent: Oct. 24, 2023

(54) METHOD FOR PRODUCING THREE-DIMENSIONAL SHAPED ARTICLE USING APPLIED REHEATING AND SECONDARY SHAPING STEPS

(71) Applicant: SEIKO EPSON CORPORATION, Tokyo (JP)

(72) Inventors: Kenta Anegawa, Matsumoto (JP); Daizo Aoyagi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 3 days.

(21) Appl. No.: 17/160,804

(22) Filed: Jan. 28, 2021

(65) Prior Publication Data

US 2021/0237348 A1 Aug. 5, 2021

(30) Foreign Application Priority Data

Jan. 31, 2020 (JP) .................................. 2020-014609

(51) Int. Cl.
*B29C 64/188* (2017.01)
*B29C 64/118* (2017.01)
(Continued)

(52) U.S. Cl.
CPC .......... *B29C 64/188* (2017.08); *B29C 64/118* (2017.08); *B29C 64/393* (2017.08);
(Continued)

(58) Field of Classification Search
CPC ... B29C 64/188; B29C 64/118; B29C 64/393; B29C 2793/0027; B29C 2793/009;
(Continued)

(56) References Cited

U.S. PATENT DOCUMENTS 5,226,335 A * 7/1993 Sitte .......................... G01N 1/06
  83/72
10,124,409 B2 * 11/2018 Ishimoto ............... B29C 64/153
(Continued)

FOREIGN PATENT DOCUMENTS

CN   105922586        9/2016
CN   105946237 A  *  9/2016    ............. B33Y 10/00
(Continued)

OTHER PUBLICATIONS

CN-105946237-A translation (Year: 2023).*

*Primary Examiner* — Francisco W Tschen
*Assistant Examiner* — Guy F Mongelli
(74) *Attorney, Agent, or Firm* — WORKMAN NYDEGGER

(57) ABSTRACT

A method for producing a three-dimensional shaped article includes shaping a first portion constituting at least a part of the three-dimensional shaped article by ejecting a molten material according to shaping data generated based on a shape resulting from adding a cutting allowance for cutting processing to a target shape of the three-dimensional shaped article, performing the cutting processing for the first portion, obtaining a measured shape of the first portion by measuring a shape of the first portion, specifying an excess portion and a lacking portion of the first portion by comparing a shape of a portion corresponding to the first portion of the target shape with the measured shape, performing the cutting processing for the specified excess portion when the excess portion was specified, and ejecting the molten material so as to fill the specified lacking portion when the lacking portion was specified.

14 Claims, 9 Drawing Sheets

(51) Int. Cl.
  *B29C 64/393* (2017.01)
  *B33Y 50/02* (2015.01)
  *B33Y 40/20* (2020.01)
  *B33Y 10/00* (2015.01)

(52) U.S. Cl.
  CPC  *B29C 2793/009* (2013.01); *B29C 2793/0027* (2013.01); *B33Y 10/00* (2014.12); *B33Y 40/20* (2020.01); *B33Y 50/02* (2014.12)

(58) Field of Classification Search
  CPC . B29C 2793/00; B29C 64/209; B29C 64/241; B29C 64/295; B29C 64/30; B29C 64/106; B29C 64/307; B29C 64/386; B33Y 10/00; B33Y 40/20; B33Y 50/02; B33Y 30/00; B33Y 50/00; Y02P 10/25; B22D 23/003; B22F 2003/247; B22F 10/18; B22F 10/38; B22F 10/66; B22F 12/90
  See application file for complete search history.

(56) References Cited

U.S. PATENT DOCUMENTS

| | | | |
|---|---|---|---|
| 2002/0093115 A1* | 7/2002 | Jang | B33Y 10/00 |
| | | | 264/494 |
| 2018/0264550 A1 | 9/2018 | Araie | |
| 2018/0290387 A1* | 10/2018 | Yoshida | B29C 67/00 |
| 2019/0283184 A1* | 9/2019 | Zhang | B23K 31/125 |
| 2020/0269502 A1* | 8/2020 | Anegawa | B29C 64/209 |
| 2021/0053279 A1* | 2/2021 | Murao | B29C 64/393 |

FOREIGN PATENT DOCUMENTS

| | | |
|---|---|---|
| CN | 109551496 | 4/2019 |
| JP | 2018-150592 A | 9/2018 |
| JP | 2019-031011 A | 2/2019 |
| WO | 2017/110375 A | 6/2017 |
| WO | 2018/211010 | 11/2018 |

* cited by examiner

ND FOR PRODUCING# METHOD FOR PRODUCING THREE-DIMENSIONAL SHAPED ARTICLE USING APPLIED REHEATING AND SECONDARY SHAPING STEPS

The present application is based on, and claims priority from JP Application Serial Number 2020-014609, filed on Jan. 31, 2020, the disclosure of which is hereby incorporated by reference herein in its entirety.

BACKGROUND

1. Technical Field

The present disclosure relates to a method for producing a three-dimensional shaped article and a three-dimensional shaping apparatus.

2. Related Art

JP-A-2019-031011 describes a technique in which a three-dimensional shaped article is shaped by a fused deposition modeling method, and the shaped three-dimensional shaped article is finished in a target shape by performing cutting processing.

In the technique, a lacking portion or an excess portion may occur in the three-dimensional shaped article after shaping due to shrinkage by cooling of a molten material or shaping accuracy. When a lacking portion occurred, a cutting allowance necessary for cutting processing may not be able to be ensured, or the lacking portion may remain in the three-dimensional shaped article after cutting processing, and when an excess portion occurred, the excess portion may remain in the three-dimensional shaped article after cutting processing. Therefore, the three-dimensional shaped article may not be able to be produced with high dimensional accuracy.

SUMMARY

According to a first aspect of the present disclosure, a method for producing a three-dimensional shaped article is provided. The method for producing a three-dimensional shaped article includes a first shaping step of shaping a first portion constituting at least a part of the three-dimensional shaped article by ejecting a molten material obtained by melting a material containing a thermoplastic resin according to shaping data generated based on a shape resulting from adding a cutting allowance for cutting processing to a target shape of the three-dimensional shaped article, a cutting step of performing the cutting processing for the first portion, a measuring step of obtaining a measured shape of the first portion by measuring a shape of the first portion, a specifying step of specifying an excess portion and a lacking portion of the first portion by comparing a shape of a portion corresponding to the first portion of the target shape with the measured shape, an additional cutting step of performing the cutting processing for the specified excess portion when the excess portion was specified, and an additional shaping step of ejecting the molten material so as to fill the specified lacking portion when the lacking portion was specified.

According to a second aspect of the present disclosure, a three-dimensional shaping apparatus is provided. The three-dimensional shaping apparatus includes a shaping portion that ejects a molten material obtained by melting a material containing a thermoplastic resin to a stage, a cutting portion having a cutting tool, a measuring portion that measures a shape of the molten material stacked on the stage, and a controller that controls the shaping portion, the cutting portion, and the measuring portion, wherein the controller executes a shaping process for shaping a first portion constituting at least a part of a three-dimensional shaped article by ejecting the molten material from the shaping portion according to shaping data generated based on a shape resulting from adding a cutting allowance for cutting processing to a target shape of the three-dimensional shaped article, a cutting process for performing the cutting processing for the first portion using the cutting portion, a measuring process for obtaining a measured shape of the first portion by measuring a shape of the first portion using the measuring portion, a specifying process for specifying an excess portion and a lacking portion of the first portion by comparing a shape of a portion corresponding to the first portion of the target shape with the measured shape, an additional cutting process for performing the cutting processing for the specified excess portion using the cutting portion when the excess portion was specified, and an additional shaping process for ejecting the molten material from the shaping portion so as to fill the specified lacking portion when the lacking portion was specified.

DESCRIPTION OF EXEMPLARY EMBODIMENTS

A. First Embodiment

Figure 1:
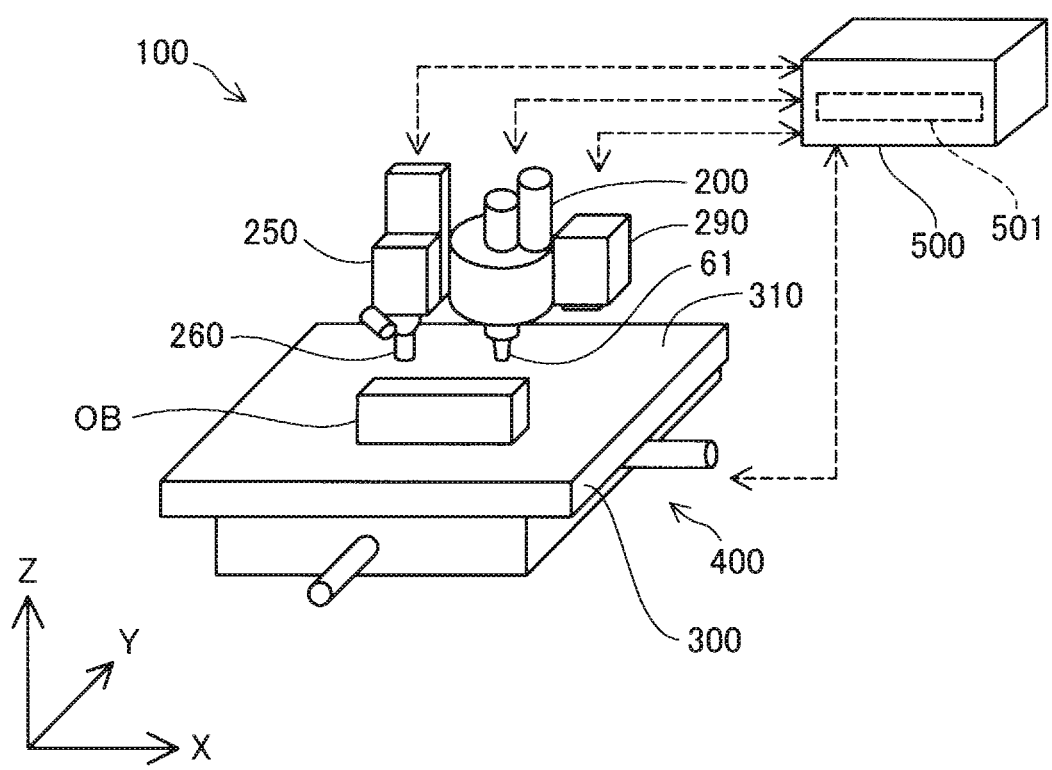
FIG. 1 is an explanatory view showing a schematic configuration of a three-dimensional shaping apparatus of a first embodiment.

FIG. 1 is an explanatory view showing a schematic configuration of a three-dimensional shaping apparatus 100 to be used in a method for producing a three-dimensional shaped article OB in a first embodiment. In FIG. 1, the three-dimensional shaped article OB is schematically shown. In FIG. 1, arrows indicating X, Y, and Z directions orthogonal to one another are illustrated. The X direction and the Y direction are directions parallel to a horizontal plane, and the Z direction is a direction opposite to the direction of gravity. The arrows indicating the X, Y, and Z directions are appropriately illustrated also in other drawings so that the illustrated directions correspond to those in FIG. 1. In the following description, when the direction is specified, the positive direction that is a direction indicated by the arrow is defined as "+", and the negative direction that is a direction opposite to the direction indicated by the arrow is defined as "−", and the plus and minus symbols are used together with the indication of the direction.

The three-dimensional shaping apparatus 100 in this embodiment includes a shaping unit 200, a cutting unit 250, a measuring unit 290, a stage 300, a moving mechanism 400, and a controller 500. The three-dimensional shaping apparatus 100 stacks a shaping material on the stage 300 by driving the moving mechanism 400 so as to change the relative position of a nozzle 61 provided in the shaping unit 200 and the stage 300 while ejecting the shaping material to the stage 300 from the nozzle 61 under the control of the controller 500. The three-dimensional shaping apparatus 100 cuts the shaping material stacked on the stage 300 with a cutting tool 260 attached to the cutting unit 250 by driving the moving mechanism 400 so as to change the relative position of the cutting tool 260 and the stage 300 while rotating the cutting tool 260 under the control of the controller 500. The three-dimensional shaped article OB having a desired shape is formed by stacking the shaping material using the shaping unit 200 and by cutting the shaping material using the cutting unit 250. The configuration of the shaping unit 200 will be described later. The shaping unit 200 is sometimes called "shaping portion", the cutting unit 250 is sometimes called "cutting portion", and the measuring unit 290 is sometimes called "measuring portion". The shaping material is sometimes called "molten material".

The cutting unit 250 is a cutting device that performs cutting of the shaping material stacked on the stage 300 by rotating the cutting tool 260 attached to a shaft of a head tip. As the cutting tool 260, for example, a flat end mill or a ball end mill can be used. The cutting unit 250 detects the position of the tip of the cutting tool 260 by a general position detection sensor and transmits the detection result to the controller 500. The controller 500 controls the moving mechanism 400 using this detection result and performs cutting by changing the relative position of the cutting tool 260 and the shaping material stacked on the stage 300. The cutting unit 250 may include a static eliminator such as an ionizer.

The measuring unit 290 measures the three-dimensional shape of the three-dimensional shaped article OB formed on the stage 300. In this embodiment, the measuring unit 290 is constituted by a non-contact type three-dimensional digitizer. The measuring unit 290 measures the three-dimensional shape of the three-dimensional shaped article OB shaped on the stage 300 using a laser beam or the like and generates measured shape data representing the measured three-dimensional shape of the three-dimensional shaped article OB. The generated measured shape data are transmitted to the controller 500. The measuring unit 290 may be constituted by a contact type three-dimensional digitizer that measures the three-dimensional shape of the three-dimensional shaped article OB using a probe and generates measured shape data.

The stage 300 is supported by the moving mechanism 400. The stage 300 has a shaping face 310 opposed to the shaping unit 200, the cutting unit 250, or the measuring unit 290. The shaping material is stacked on the shaping face 310. In this embodiment, the shaping face 310 is provided parallel to a horizontal plane.

The moving mechanism 400 changes the relative position of the shaping unit 200 and the stage 300, the relative position of the cutting unit 250 and the stage 300, and the relative position of the measuring unit 290 and the stage 300.

In this embodiment, the moving mechanism 400 changes the relative position of the shaping unit 200 and the stage 300, the relative position of the cutting unit 250 and the stage 300, and the relative position of the measuring unit 290 and the stage 300 by moving the stage 300. The moving mechanism 400 in this embodiment is constituted by a three-axis positioner for moving the stage 300 in three axis directions of the X, Y, and Z directions by the driving forces of three motors. Each motor drives under the control of the controller 500. The moving mechanism 400 need not be configured to move the stage 300, but may be configured to change the relative position of the shaping unit 200 and the stage 300, the relative position of the cutting unit 250 and the stage 300, and the relative position of the measuring unit 290 and the stage 300 by moving the shaping unit 200, the cutting unit 250, and the measuring unit 290 without moving the stage 300. In that case, the moving mechanism 400 may be configured to move the three units: the shaping unit 200, the cutting unit 250, and the measuring unit 290 as one unit with respect to the stage 300, or may be configured to move two units among the shaping unit 200, the cutting unit 250, and the measuring unit 290 as one unit, or may be configured to move the shaping unit 200, the cutting unit 250, and the measuring unit 290 in a mutually independent manner. Further, the moving mechanism 400 may be configured to change the relative position of the shaping unit 200 and the stage 300, the relative position of the cutting unit 250 and the stage 300, and the relative position of the measuring unit 290 and the stage 300 by moving the shaping unit 200, the cutting unit 250, the measuring unit 290, and the stage 300. The moving mechanism 400 may have a function of tilting the shaping face 310 of the stage 300 with respect to the horizontal plane, or a function of tilting the nozzle 61 or the cutting tool 260 with respect to the shaping face 310.

The controller 500 is constituted by a computer including one or a plurality of processors, a main storage device, and an input/output interface for performing signal input/output to/from the outside. The controller 500 exhibits various functions by execution of a program or a command read on the main storage device by the processor. In this embodiment, the controller 500 includes a data generation portion 501. The data generation portion 501 executes a data generation process for generating shaping data and cutting data to be used for forming a three-dimensional shaped article as described below. Further, the controller 500 executes a three-dimensional shaping process for forming the three-dimensional shaped article OB using the shaping data and the cutting data. The controller 500 need not be constituted by a computer, but may be constituted by a combination of a plurality of circuits.

Figure 2:
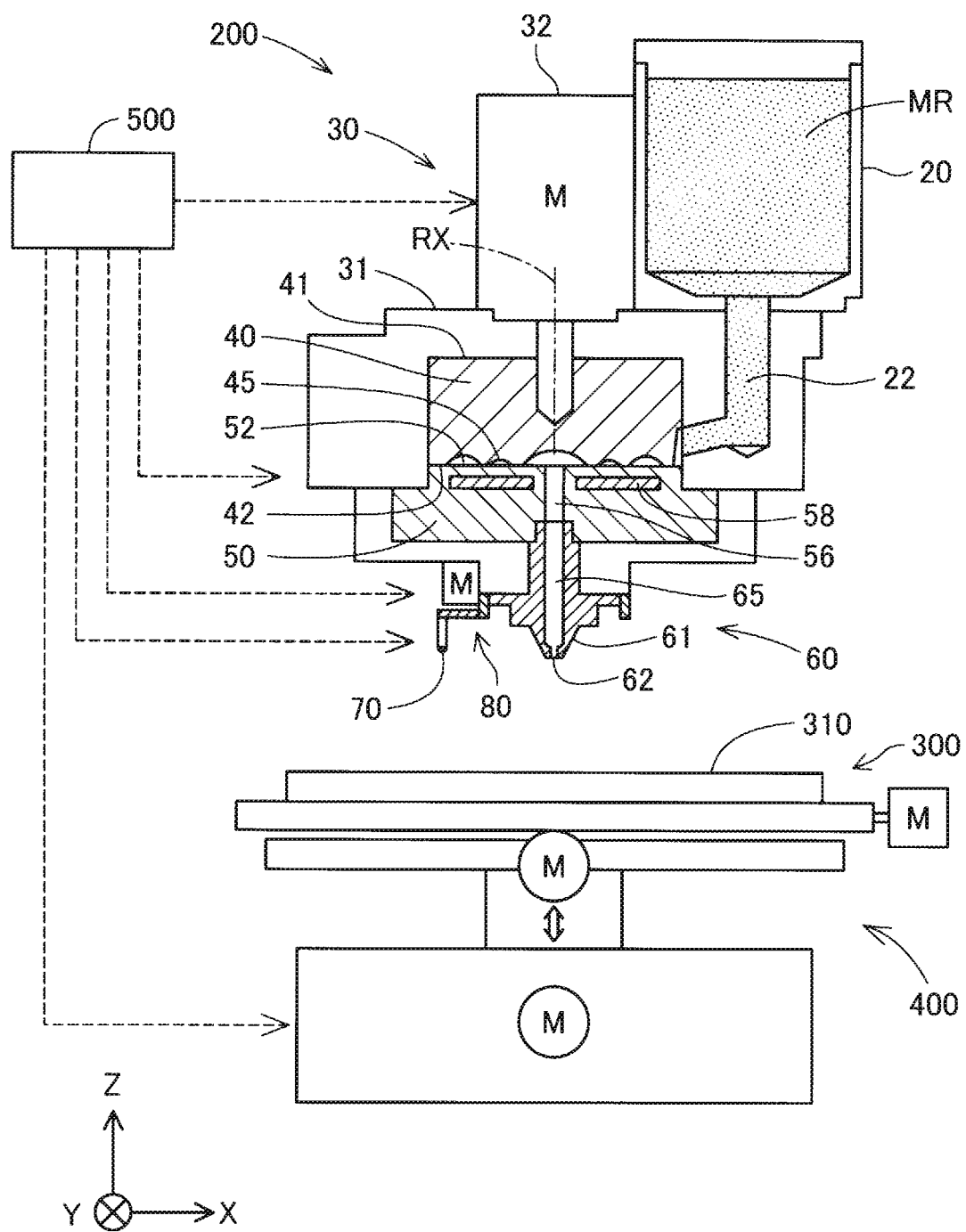
FIG. 2 is an explanatory view showing a schematic configuration of a shaping unit of the first embodiment.

FIG. 2 is an explanatory view showing a schematic configuration of the shaping unit 200 in this embodiment. In FIG. 2, the stage 300, the moving mechanism 400, and the controller 500 are shown together with the shaping unit 200. The shaping unit 200 includes a material supply portion 20 that is a supply source of a material MR, a plasticizing portion 30 that plasticizes the material MR to form a shaping material, an ejection portion 60 that ejects the shaping material, and a reheating portion 70 for heating the shaping material stacked on the stage 300. The "plasticizing" means melting by applying heat to a material having thermoplasticity. The "melting" not only means transforming a material having thermoplasticity into a liquid by heating the material to a temperature equal to or higher than the melting point of the material, but also means softening a material having thermoplasticity by heating the material to a temperature equal to or higher than the glass transition point so as to exhibit fluidity.

The material supply portion 20 supplies the material MR for forming the shaping material to the plasticizing portion 30. In this embodiment, an ABS resin formed into a pellet shape is used as the material MR. In this embodiment, the material supply portion 20 is constituted by a hopper that stores the material MR. A supply channel 22 that couples the material supply portion 20 and the plasticizing portion 30 to each other is provided below the material supply portion 20. The material MR stored in the material supply portion 20 is supplied to the plasticizing portion 30 through the supply channel 22.

The plasticizing portion 30 plasticizes the material MR supplied from the material supply portion 20 to form the shaping material and supplies the material to the ejection portion 60. The plasticizing portion 30 includes a screw case 31, a driving motor 32, a flat screw 40, a barrel 50, and a heating portion 58. The screw case 31 is a housing that stores the flat screw 40. To a lower end part of the screw case 31, the barrel 50 is fixed, and the flat screw 40 is housed in a space surrounded by the screw case 31 and the barrel 50.

The flat screw 40 has a substantially columnar shape whose height in a direction along its central axis RX is smaller than the diameter. The flat screw 40 is disposed in the screw case 31 so that the central axis RX becomes parallel to the Z direction. The flat screw 40 at an upper face 41 side is coupled to the driving motor 32, and by a torque generated by the driving motor 32, the flat screw 40 is rotated around the central axis RX in the screw case 31. The flat screw 40 has a groove formed face 42 with a groove portion 45 formed therein at an opposite side to the upper face 41. The barrel 50 has a screw opposed face 52 opposed to the groove formed face 42 of the flat screw 40. At the center of the screw opposed face 52, a through-hole 56 that communicates with the ejection portion 60 is provided.

Figure 3:
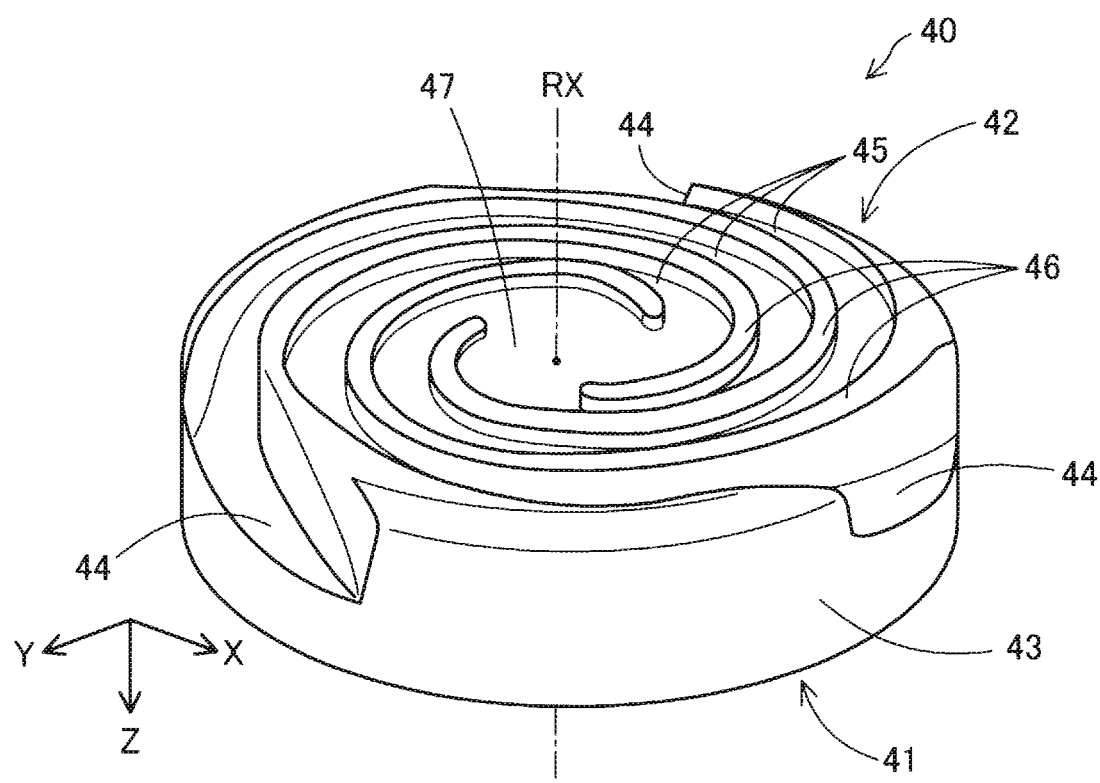
FIG. 3 is a perspective view showing a configuration of a flat screw.

FIG. 3 is a perspective view showing a configuration of the flat screw 40. In FIG. 3, the flat screw 40 is shown in a direction vertically opposite to that in FIG. 2 for facilitating the understanding of the technique. In FIG. 3, the position of the central axis RX of the flat screw 40 is indicated by a long dashed short dashed line. A central portion 47 of the groove formed face 42 of the flat screw 40 is configured as a recess to which one end of the groove portion 45 is coupled. The central portion 47 is opposed to the through-hole 56 of the barrel 50 shown in FIG. 2. The central portion 47 crosses the central axis RX. In this embodiment, the groove portion 45 extends in a spiral shape so as to draw an arc toward the outer circumference of the flat screw 40 from the central portion 47. The groove portion 45 may be configured to have an involute curve shape or may be configured to extend in a helical shape. In the groove formed face 42, a projecting ridge portion 46 that constitutes a side wall portion of the groove portion 45 and that extends along each groove portion 45 is provided. The groove portion 45 continues to a material inlet 44 formed in a side face 43 of the flat screw 40. This material inlet 44 is a portion for receiving the material MR supplied through the supply channel 22 of the material supply portion 20. The material MR introduced into the groove portion 45 from the material inlet 44 is conveyed toward the central portion 47 in the groove portion 45 by the rotation of the flat screw 40.

In FIG. 3, the flat screw 40 having three groove portions 45 and three projecting ridge portions 46 is shown. The number of groove portions 45 or projecting ridge portions 46 provided in the flat screw 40 is not limited to 3. In the flat screw 40, only one groove portion 45 may be provided, or a plurality of (two or more) groove portions 45 may be provided. Further, an arbitrary number of projecting ridge portions 46 may be provided according to the number of groove portions 45. In FIG. 3, the flat screw 40 in which the material inlet 44 is formed at three sites is shown. The number of sites where the material inlet 44 is provided in the flat screw 40 is not limited to 3. In the flat screw 40, the material inlet 44 may be provided at only one site or may be provided at a plurality of (two or more) sites.

Figure 4:
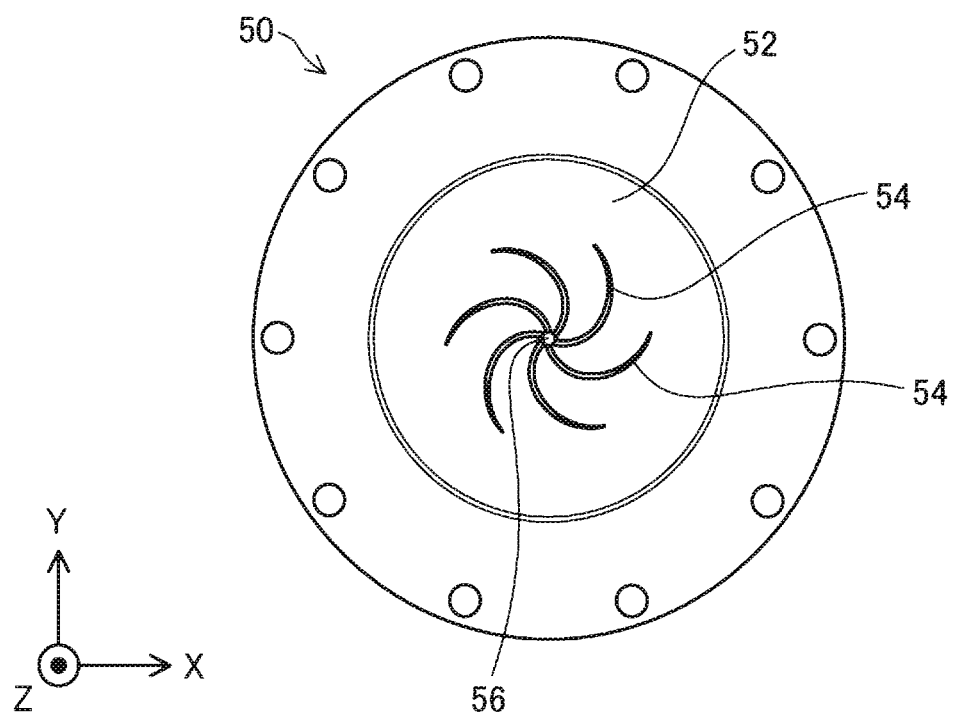
FIG. 4 is a top view showing a configuration of a barrel.

FIG. 4 is a top view showing a configuration of the barrel 50. As described above, at the center of the screw opposed face 52, the through-hole 56 that communicates with the ejection portion 60 is formed. Around the through-hole 56 in the screw opposed face 52, a plurality of guide grooves 54 are formed. One end of each of the guide grooves 54 is coupled to the through-hole 56, and each guide groove 54 extends in a spiral shape toward the outer circumference of the screw opposed face 52 from the through-hole 56. Each guide groove 54 has a function of guiding the shaping material to the through-hole 56. Note that the guide groove 54 need not be provided in the screw opposed face 52.

As shown in FIG. 2, in the barrel 50, the heating portion 58 for heating the material MR is embedded. The heating portion 58 need not be embedded in the barrel 50, but may be disposed below the barrel 50. In this embodiment, the heating portion 58 is constituted by a heater that generates heat by receiving supply of electric power. The output of the heating portion 58 is controlled by the controller 500. The material MR conveyed in the groove portion 45 is plasticized by shearing due to rotation of the flat screw 40 and heat from the heating portion 58 to form the shaping material in a paste form. The shaping material is supplied to the ejection portion 60 from the through-hole 56.

The ejection portion 60 ejects the shaping material supplied from the plasticizing portion 30. The ejection portion 60 includes the nozzle 61 and a flow channel 65. The nozzle 61 is provided in a lower end part of the ejection portion 60. In a lower end part of the nozzle 61, a nozzle hole 62 for ejecting the shaping material is provided. In this embodiment, in the nozzle 61, the nozzle hole 62 having a circular opening shape is provided. The opening shape of the nozzle hole 62 need not be a circular shape, but may be, for example, an elliptical shape or a polygonal shape such as a quadrangular shape. The flow channel 65 communicates with the through-hole 56 of the barrel 50 and the nozzle hole 62, and the shaping material flows therethrough to the nozzle hole 62 from the through-hole 56. The shaping material flowing through the flow channel 65 is ejected from the nozzle hole 62.

The reheating portion 70 heats the shaping material stacked on the stage 300. In this embodiment, the reheating portion 70 is constituted by an infrared heater that emits an infrared ray. The reheating portion 70 may be constituted by a warm air heater. The output of the reheating portion 70 is controlled by the controller 500. In this embodiment, the reheating portion 70 is supported by a rotating mechanism 80, and is disposed at a lateral side of the nozzle 61.

The rotating mechanism 80 changes the position of the reheating portion 70 with respect to the nozzle 61. In this embodiment, the rotating mechanism 80 is constituted by a rail fixed to a lower end portion of the barrel 50 so as to surround the outer circumference of the nozzle 61, a support member that supports the reheating portion 70, a stepping motor that is driven under the control of the controller 500 so as to move the reheating portion 70 and the support member along the rail, a gear, or the like. The rotating mechanism 80 changes the position of the reheating portion 70 with respect to the nozzle 61 according to the moving direction of the nozzle 61 with respect to the stage 300. For example, when the nozzle 61 moves to the +X direction side with respect to the stage 300, the rotating mechanism 80 changes the position of the reheating portion 70 to the +X direction side of the nozzle 61, and when the nozzle 61 moves to the +Y direction side with respect to the stage 300, the rotating mechanism 80 changes the position of the reheating portion 70 to the +Y direction side of the nozzle 61. Note that the reheating portion 70 and the rotating mechanism 80 need not be provided in the three-dimensional shaping apparatus 100.

Figure 5:
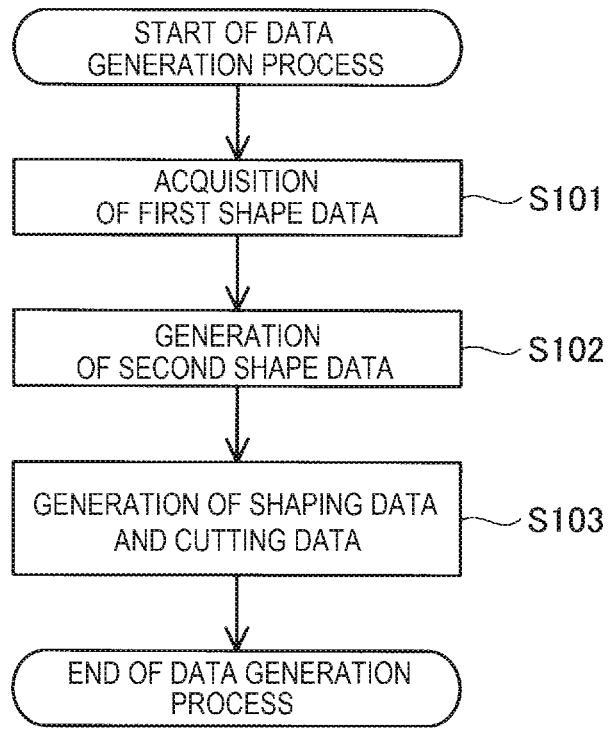
FIG. 5 is a flowchart showing contents of a data generation process of the first embodiment.

FIG. 5 is a flowchart showing contents of a data generation process in this embodiment. This process is executed by the data generation portion 501 of the controller 500 prior to the execution of the below-mentioned three-dimensional shaping process. This process is started by the data generation portion 501 when a given start command is supplied to the controller 500. The start command is, for example, supplied to the controller 500 when a user performs a given operation on an operation panel provided in the three-dimensional shaping apparatus 100 or a computer coupled to the three-dimensional shaping apparatus 100.

Figure 6:
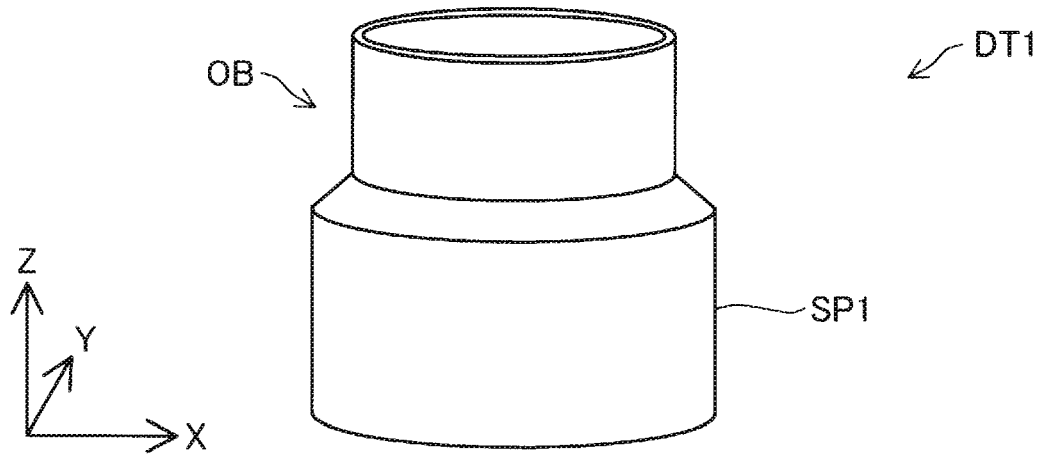
FIG. 6 is an explanatory view showing an example of first shape data of a three-dimensional shaped article.

FIG. 6 is an explanatory view showing an example of first shape data DT1 of the three-dimensional shaped article OB. In Step S101 in FIG. 5, the data generation portion 501 acquires first shape data DT1. The data generation portion 501 acquires the first shape data DT1 from, for example, a computer coupled to the three-dimensional shaping apparatus 100 or a recording medium such as a USB memory. In the first shape data DT1, a target shape SP1 of the three-dimensional shaped article OB is represented. The first shape data DT1 are generated using, for example, three-dimensional CAD software or three-dimensional CG software. The first shape data DT1 is represented in, for example, STL format, IGES format, or STEP format. In FIG. 6, the target shape SP1 of the three-dimensional shaped article OB in a cylindrical shape is shown as an example. Note that the target shape SP1 is sometimes called "first target shape".

Figure 7:
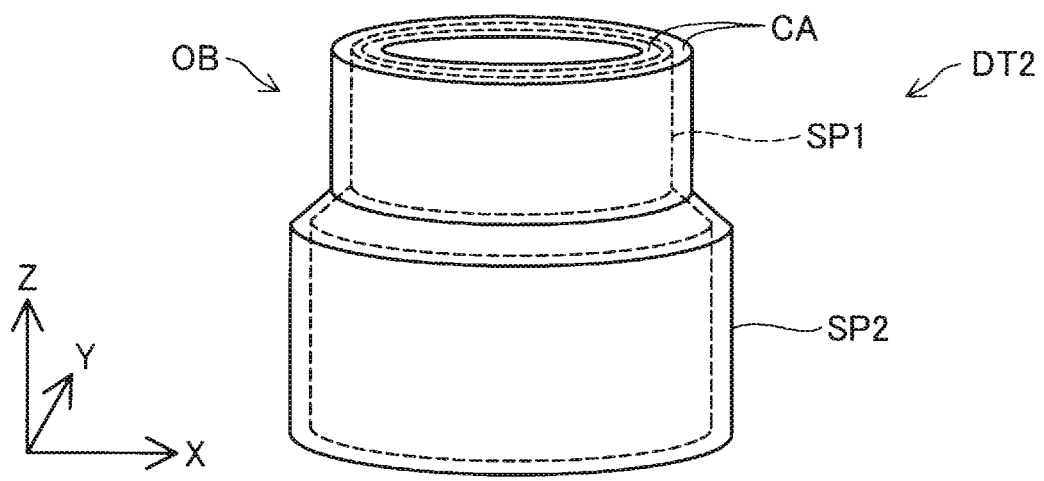
FIG. 7 is an explanatory view showing an example of second shape data of a three-dimensional shaped article.

FIG. 7 is an explanatory view showing an example of second shape data DT2 of the three-dimensional shaped article OB. In Step S102 in FIG. 5, the data generation portion 501 analyzes the first shape data DT1 and generates the second shape data DT2. In the second shape data DT2, a thickened shape SP2 resulting from adding a cutting allowance CA for cutting processing to the target shape SP1 of the three-dimensional shaped article OB is represented. The second shape data DT2 is represented in, for example, STL format, IGES format, or STEP format. In FIG. 7, as an example, the thickened shape SP2 resulting from adding the cutting allowance CA to an outer peripheral portion and an inner peripheral portion of the target shape SP1 of the three-dimensional shaped article OB in a cylindrical shape shown in FIG. 6 is indicated by a solid line, and the target shape SP1 of the three-dimensional shaped article OB in a cylindrical shape is indicated by a broken line. Note that the thickened shape SP2 is sometimes called "second target shape".

In Step S103 in FIG. 5, the data generation portion 501 analyzes the second shape data DT2 and generates shaping data and cutting data. In the shaping data, information regarding a shaping path that is a moving path of the nozzle 61 that moves with respect to the stage 300 while ejecting the shaping material, the amount of the shaping material to be ejected from the nozzle 61, a target temperature of the heating portion 58, or the like is represented. In the cutting data, information regarding a cutting path that is a moving path of the cutting tool 260 that moves with respect to the stage 300 while rotating, the number of revolutions of the cutting tool 260, the feed speed of the cutting tool 260, or the like is represented. The controller 500 generates the shaping data and the cutting data represented in, for example, G-code, M-code, or the like. Thereafter, the data generation portion 501 terminates this process.

Figure 8:
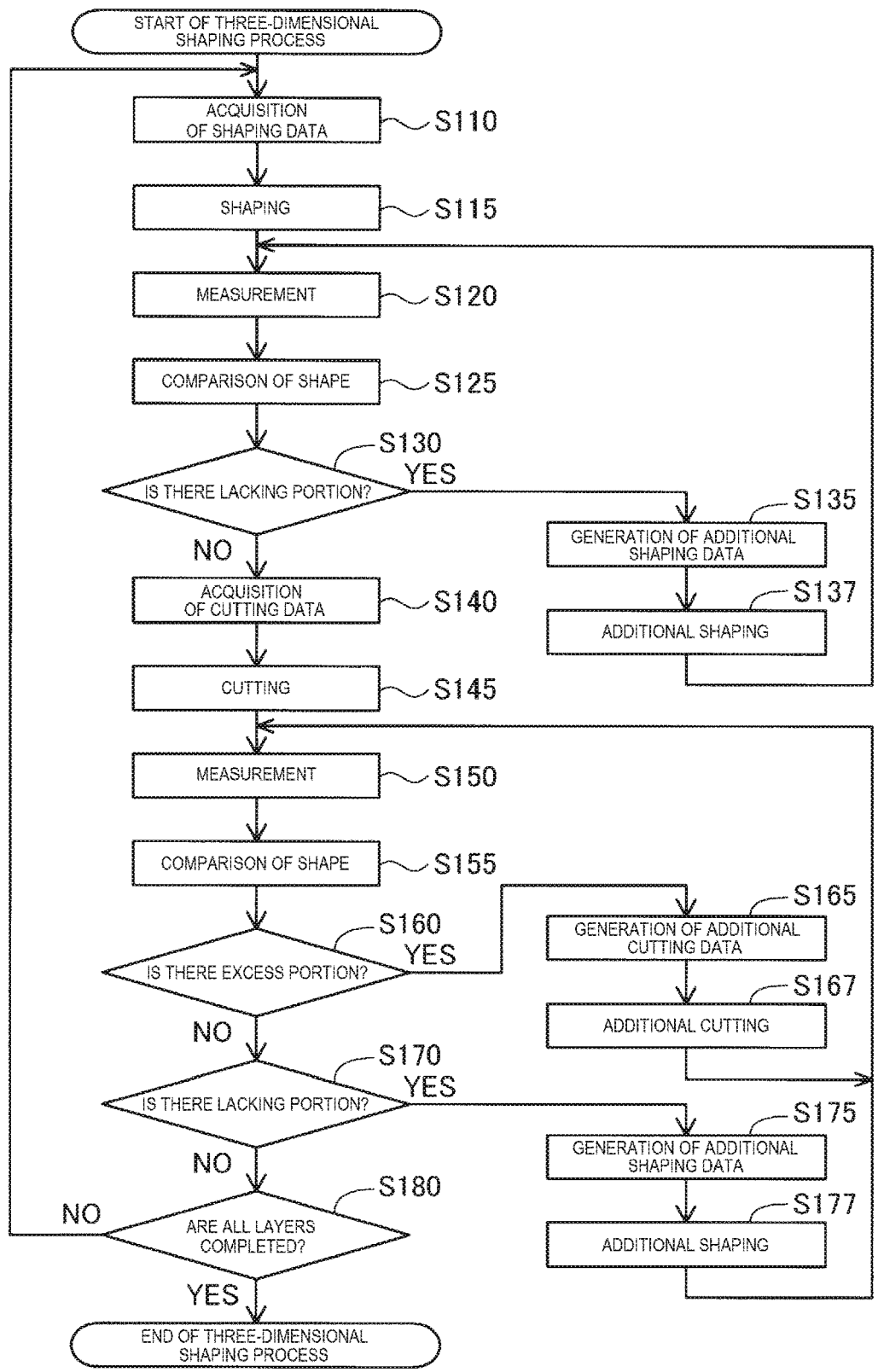
FIG. 8 is a flowchart showing contents of a three-dimensional shaping process of the first embodiment.

FIG. 8 is a flowchart showing contents of a three-dimensional shaping process for realizing the method for producing the three-dimensional shaped article OB in this embodiment. This process is executed by the controller 500. This process is started by the controller 500 when a given start command is supplied to the controller 500. The start command is supplied to the controller 500 when a user performs a given operation on an operation panel provided in the three-dimensional shaping apparatus 100 or a computer coupled to the three-dimensional shaping apparatus 100.

First, in Step S110, the controller 500 acquires shaping data for shaping a first portion PP1 that is at least apart of the three-dimensional shaped article OB from the data generation portion 501. In this embodiment, the first portion PP1 is a portion constituting layers from a first layer to a fifth layer that are a part of the three-dimensional shaped article OB. In the first portion PP1, all the layers of the three-dimensional shaped article OB may be included. Subsequently, in Step S115, the controller 500 controls the shaping unit 200 and the moving mechanism 400 according to the acquired shaping data so as to stack a layer of the shaping material on the stage 300, thereby shaping the first portion PP1. Note that the process of Step S115 to be executed for shaping the first portion PP1 is sometimes called "first shaping step" in the method for producing the three-dimensional shaped article OB. Further, the process of Step S115 to be executed for shaping the first portion PP1 is sometimes called "first shaping process".

Thereafter, in Step S120, the controller 500 controls the measuring unit 290 so as to measure the three-dimensional shape of the first portion PP1 shaped on the stage 300, thereby acquiring measured shape data DT3 representing the measured shape SP3 of the measured first portion PP1. In Step S125, the controller 500 specifies a lacking portion LP of the first portion PP1 by comparing the shape of a portion corresponding to the first portion PP1 of the thickened shape SP2 represented by the second shape data DT2 with the measured shape SP3 of the first portion PP1 represented by the measured shape data DT3. The controller 500 specifies a portion that is represented by the shape of a portion corresponding to the first portion PP1 of the thickened shape SP2 and is not represented by the measured shape SP3 of the first portion PP1 as the lacking portion LP. At that time, when the size of the lacking portion LP is equal to or less than a predetermined threshold value, the controller 500 may ignore the lacking portion LP with a size equal to or less than the threshold value. Note that the process of Step S120 is sometimes called "measuring step" in the method for producing the three-dimensional shaped article OB, and the process of Step S125 is sometimes called "specifying step" in the method. Further, the process of Step S120 is sometimes called "measuring process", and the process of Step S125 is sometimes called "specifying process".

Figure 9:
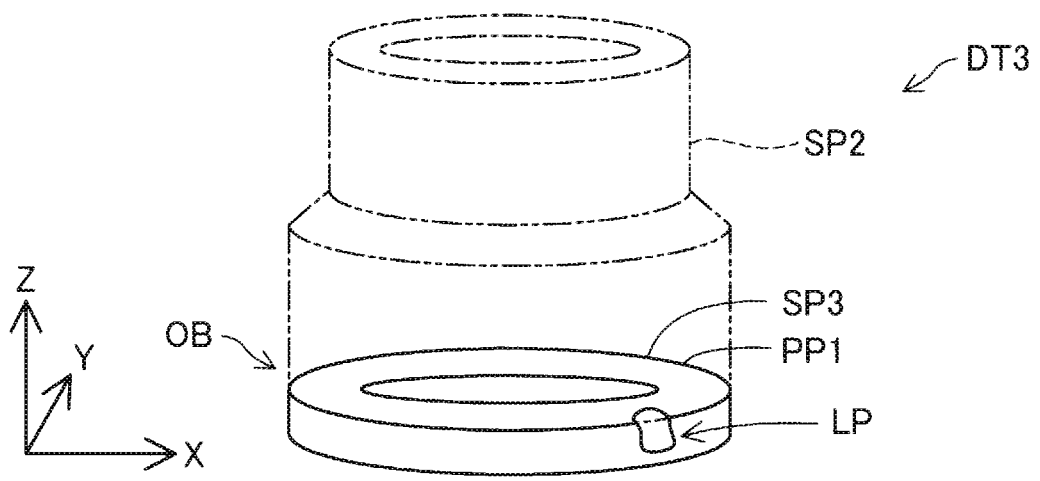
FIG. 9 is a first explanatory view showing an example of a three-dimensional shaped article in production.

FIG. 9 is a first explanatory view showing an example of the three-dimensional shaped article OB in production. In FIG. 9, the shaped first portion PP1 is shown. In this example, the first portion PP1 has a lacking portion LP.

Therefore, in the first portion PP1, the cutting allowance CA for cutting processing is not sufficiently ensured.

In Step S130 in FIG. 8, the controller 500 determines whether there is a lacking portion LP in the first portion PP1. When a lacking portion LP was specified in the process of Step S125, the controller 500 determines that there is a lacking portion LP in the first portion PP1. When it was determined that there is a lacking portion LP in Step S130, the controller 500 generates additional shaping data that are shaping data for filling the lacking portion LP with the shaping material in Step S135. The controller 500 can generate the additional shaping data using the second shape data DT2. In Step S137, the controller 500 controls the shaping unit 200 and the moving mechanism 400 so as to eject the shaping material from the nozzle 61 toward the lacking portion LP and fill the lacking portion LP with the shaping material according to the additional shaping data generated in Step S135. Thereafter, the controller 500 returns the process to Step S120 and executes the process from Step S120 to Step S130 again. The controller 500 repeats the process of Step S135, Step S137, and from Step S120 to Step S130 until it is not determined that there is a lacking portion LP in Step S130. On the other hand, when it was not determined that there is a lacking portion LP in Step S130, the controller 500 advances the process to Step S140. That is, after the cutting allowance CA for cutting processing is sufficiently ensured, the controller 500 advances the process to Step S140. Note that the process of Step S137 is sometimes called "additional shaping step" in the method for producing the three-dimensional shaped article OB. Further, the process of Step S137 is sometimes called "additional shaping process".

In Step S140, the controller 500 acquires cutting data for performing cutting processing for the first portion PP1 from the data generation portion 501. In Step S145, the controller 500 controls the cutting unit 250 and the moving mechanism 400 so as to perform cutting processing for the first portion PP1 according to the acquired cutting data. Note that the process of Step S145 is sometimes called "cutting step" in the method for producing the three-dimensional shaped article OB. Further, the process of Step S145 is sometimes called "cutting process".

In Step S150, the controller 500 controls the measuring unit 290 so as to measure the three-dimensional shape of the first portion PP1 after cutting processing, thereby acquiring measured shape data DT4 representing the measured shape SP4 of the first portion PP1 measured after cutting processing. In Step S155, the controller 500 specifies an excess portion EP and a lacking portion LP of the first portion PP1 after cutting processing by comparing the shape of a portion corresponding to the first portion PP1 of the target shape SP1 of the three-dimensional shaped article OB represented by the first shape data DT1 with the measured shape SP4 of the first portion PP1 represented by the measured shape data DT4. The controller 500 specifies a portion that is represented by the measured shape SP4 of the first portion PP1 and is not represented by the shape of a portion corresponding to the first portion PP1 of the target shape SP1 as the excess portion EP. The controller 500 specifies a portion that is represented by the shape of a portion corresponding to the first portion PP1 of the target shape SP1 and is not represented by the measured shape SP4 of the first portion PP1 as the lacking portion LP. At that time, when the size of the lacking portion LP or the excess portion EP is equal to or less than a predetermined threshold value, the controller 500 may ignore the lacking portion LP or the excess portion EP with a size equal to or less than the threshold value. Note that the process of Step S150 is sometimes called "measuring step" in the method for producing the three-dimensional shaped article OB, and the process of Step S155 is sometimes called "specifying step" in the method. Further, the process of Step S150 is sometimes called "measuring process", and the process of Step S155 is sometimes called "specifying process".

Figure 10:
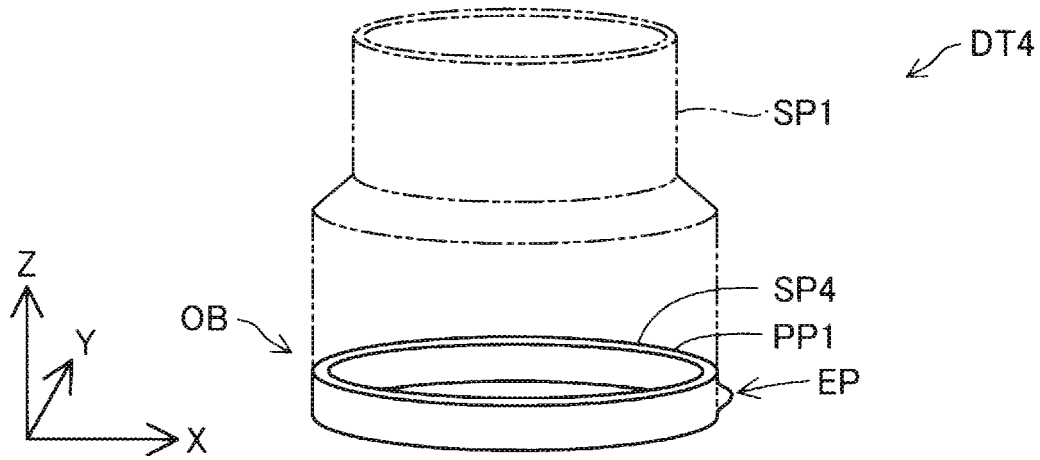
FIG. 10 is a second explanatory view showing an example of a three-dimensional shaped article in production.

FIG. 10 is a first explanatory view showing an example of the three-dimensional shaped article OB in production. In FIG. 10, the measured shape SP4 of the first portion PP1 after cutting processing is indicated by a solid line, and the target shape SP1 of the three-dimensional shaped article OB is indicated by a long dashed double-short dashed line. In this example, the first portion PP1 has an excess portion EP and does not have a lacking portion LP.

In Step S160 in FIG. 8, the controller 500 determines whether there is an excess portion EP in the first portion PP1 after cutting processing. When an excess portion EP was specified in the process of Step S155, the controller 500 determines that there is an excess portion EP in the first portion PP1 after cutting processing. When it was determined that there is an excess portion EP in Step S160, the controller 500 generates additional cutting data that are cutting data for performing cutting processing for the specified excess portion EP in Step S165. The controller 500 can generate the additional cutting data using the measured shape data DT4. In Step S167, the controller 500 controls the cutting unit 250 and the moving mechanism 400 so as to perform cutting processing for the specified excess portion EP and remove the excess portion EP according to the additional cutting data generated in Step S165. Thereafter, the controller 500 returns the process to Step S150 and executes the process from Step S150 to Step S160 again. The controller 500 repeats the process of Step S165, Step S167, and from Step S150 to Step S160 until it is not determined that there is an excess portion EP in Step S160. On the other hand, when it was not determined that there is an excess portion EP in Step S160, the controller 500 advances the process to Step S170. Note that the process of Step S167 is sometimes called "additional cutting step" in the method for producing the three-dimensional shaped article OB. Further, the process of Step S167 is sometimes called "additional cutting process".

In Step S170, the controller 500 determines whether there is a lacking portion LP in the first portion PP1 after cutting processing. When a lacking portion LP was specified in the process of Step S155, the controller 500 determines that there is a lacking portion LP in the first portion PP1 after cutting processing. When it was determined that there is a lacking portion LP in the first portion PP1 after cutting processing in Step S170, the controller 500 generates additional shaping data that are shaping data for filling the specified lacking portion LP with the shaping material. The controller 500 can generate the additional shaping data using the first shape data DT1. In Step S177, the controller 500 controls the shaping unit 200 and the moving mechanism 400 so as to eject the shaping material from the nozzle 61 toward the specified lacking portion LP and fill the lacking portion LP with the shaping material according to the additional shaping data generated in Step S175. Thereafter, the controller 500 returns the process to Step S150 and executes the process from Step S150 to Step S170 again. The controller 500 repeats the process of Step S175, Step S177, and from Step S150 to Step S170 until it is not determined that there is a lacking portion LP in Step S170. On the other hand, when it was not determined that there is a lacking portion LP in Step S170, the controller 500 advances the process to Step S180. Note that the process of Step S177 is sometimes called "additional shaping step" in the method for producing the three-dimensional shaped article OB. Further, the process of Step S177 is sometimes called "additional shaping process".

In Step S180, the controller 500 determines whether the formation of all the layers constituting the three-dimensional shaped article OB was completed. When it was not determined that the formation of all the layers constituting the three-dimensional shaped article OB was completed in Step S180, the controller 500 returns the process to Step S110 and executes the process from Step S110 to Step S170 for the second portion PP2 that is a part of the three-dimensional shaped article OB. In this embodiment, the second portion PP2 is a portion constituting layers from a sixth layer to a tenth layer that are a part of the three-dimensional shaped article OB. When the second portion PP2 of the three-dimensional shaped article OB is shaped, the controller 500 may reheat the upper face of the first portion PP1 by the reheating portion 70, and thereafter eject the shaping material from the nozzle 61 to the upper face of the first portion PP1. By reheating the upper face of the first portion PP1, the adhesion degree between the first portion PP1 and the second portion PP2 can be improved. Thereafter, the controller 500 executes the process of Step S180 again and determines whether the formation of all the layers constituting the three-dimensional shaped article OB was completed. Note that the process of Step S115 to be executed for shaping the second portion PP2 is sometimes called "second shaping step" in the method for producing the three-dimensional shaped article OB. Further, the process of Step S115 to be executed for shaping the second portion PP2 is sometimes called "second shaping process".

Figure 11:
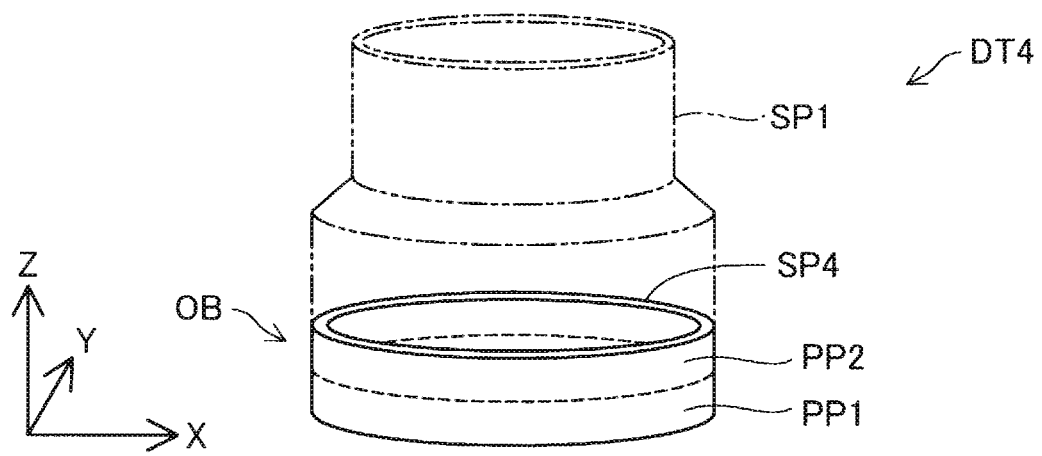
FIG. 11 is a third explanatory view showing an example of a three-dimensional shaped article in production.

FIG. 11 is a third explanatory view showing an example of the three-dimensional shaped article OB in production. In FIG. 11, the measured shape SP4 of the three-dimensional shaped article OB after shaping the second portion PP2 on the first portion PP1 and performing cutting processing for the second portion PP2 is indicated by a solid line, and the target shape SP1 of the three-dimensional shaped article OB is indicated by a long dashed double-short dashed line. In FIG. 11, a boundary between the first portion PP1 and the second portion PP2 is indicated by a broken line for the sake of convenience. The second portion PP2 is shaped after removing the lacking portion LP or the excess portion EP from the first portion PP1, and therefore, in this example, in the first portion PP1 of the three-dimensional shaped article OB, the lacking portion LP or the excess portion EP does not remain.

When it was determined that the formation of all the layers constituting the three-dimensional shaped article OB was completed in Step S180 in FIG. 8, the controller 500 terminates this process. Thereafter, the three-dimensional shaped article OB formed by the shaping process is separated from the stage 300, for example, by a user. When a support material is used for forming the three-dimensional shaped article OB, the support material is removed from the three-dimensional shaped article OB separated from the stage 300. When a metal material or a ceramic material is contained in the material for forming the three-dimensional shaped article OB, the three-dimensional shaped article OB separated from the stage 300 may be sintered in a furnace.

According to the method for producing the three-dimensional shaped article OB of this embodiment described above, when a lacking portion LP was specified in the three-dimensional shaped article OB, the specified lacking portion LP is filled with the shaping material, and when an excess portion EP was specified in the three-dimensional shaped article OB, the specified excess portion EP is removed by cutting processing, and therefore, the lacking portion LP or the excess portion EP can be prevented from remaining in the produced three-dimensional shaped article OB. Accordingly, the three-dimensional shaped article OB can be produced with high dimensional accuracy. In particular, in this embodiment, the three-dimensional shaping apparatus 100 automatically produces the three-dimensional shaped article OB so that the lacking portion LP and the excess portion EP do not remain by the data generation process and the three-dimensional shaping process after receiving supply of the first shape data DT1. Therefore, a user can easily produce the three-dimensional shaped article OB having high dimensional accuracy with the three-dimensional shaping apparatus 100. Further, a step of examining whether the lacking portion LP or the excess portion EP remains in the produced three-dimensional shaped article OB can be omitted.

Further, in this embodiment, when the lacking portion LP was specified in the first portion PP1 of the three-dimensional shaped article OB, prior to the cutting processing for the first portion PP1, the specified lacking portion LP is filled with the shaping material, and therefore, the cutting allowance CA for cutting processing for the first portion PP1 can be reliably ensured.

Further, in this embodiment, after filling the lacking portion LP of the first portion PP1 with the shaping material and removing the excess portion EP of the first portion PP1, the second portion PP2 is shaped by ejecting the shaping material onto the first portion PP1. Therefore, the lacking portion LP or the excess portion EP can be reliably prevented from remaining in the produced three-dimensional shaped article OB.

In this embodiment, an ABS resin material in a pellet form is used, however, as the material to be used in the shaping unit 200, for example, a material for shaping a three-dimensional shaped article containing any of various materials such as a material having thermoplasticity, a metal material, and a ceramic material as a main material can also be adopted. Here, the "main material" means a principal material for forming the shape of the three-dimensional shaped article and refers to a material whose content ratio is 50 wt % or more in the three-dimensional shaped article. In the above-mentioned shaping material, a material obtained by melting such a main material singly, or a material formed into a paste by melting some components contained together with the main material is included.

When a material having thermoplasticity is used as the main material, the shaping material is formed by plasticization of the material in the plasticizing portion 30. The "plasticization" means melting by applying heat to the material having thermoplasticity.

As the material having thermoplasticity, for example, any one or a combination of two or more of the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone (PEEK)

In the material having thermoplasticity, a pigment, a metal, a ceramic, or other than these, an additive such as a wax, a flame retardant, an antioxidant, or a heat stabilizer, or the like may be mixed. The material having thermoplasticity is converted into a molten state by plasticization due to the rotation of the flat screw 40 and heating by the heating portion 58 in the plasticizing portion 30. The shaping material formed in this manner is cured by decreasing the temperature after being ejected from the nozzle hole 62.

The material having thermoplasticity is desirably injected from the nozzle hole 62 in a completely molten state by being heated to a temperature equal to or higher than the glass transition point thereof. For example, an ABS resin has a glass transition point of about 120° C. and the temperature thereof when it is injected from the nozzle hole 62 is desirably about 200° C. In order to inject the shaping material in a high temperature state in this manner, a heater may be provided around the nozzle hole 62.

In the shaping unit 200, in place of the above-mentioned material having thermoplasticity, for example, the following metal material may be used as the main material. In that case, it is desirable that a component that melts when forming the shaping material is mixed in a powder material obtained by pulverizing the following metal material, and the resulting material is fed to the plasticizing portion 30.

Examples of Metal Material single metals of magnesium (Mg), iron (Fe), cobalt (Co), chromium (Cr), aluminum (Al), titanium (Ti), copper (Cu), and nickel (Ni), or alloys containing one or more of these metals Examples of Alloy a maraging steel, stainless steel, cobalt-chromium-molybdenum, a titanium alloy, a nickel alloy, an aluminum alloy, a cobalt alloy, and a cobalt-chromium alloy In the shaping unit 200, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material disposed in the stage 300 may be cured by, for example, irradiation with a laser or sintering with hot air or the like.

The powder material of the metal material or the ceramic material to be fed to the material supply portion 20 may be a mixed material obtained by mixing multiple types of single metal powders or alloy powders or ceramic material powders. Further, the powder material of the metal material or the ceramic material may be coated with, for example, a thermoplastic resin as exemplified above or any other thermoplastic resin. In that case, the material may be configured to exhibit fluidity by melting the thermoplastic resin in the plasticizing portion 30.

To the powder material of the metal material or the ceramic material to be fed to the material supply portion 20, for example, a solvent as described below can also be added. As the solvent, one type or a combination of two or more types selected from the following solvents can be used.

Examples of Solvent water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; tetra-alkyl ammonium acetates (for example, tetra-butyl ammonium acetate, etc.); ionic liquids such as butyl carbitol acetate, and the like In addition thereto, for example, a binder as described below can also be added to the powder material of the metal material or the ceramic material to be fed to the material supply portion 20.

Examples of Binder an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), or other thermoplastic resins B. Other Embodiments (B1) When it was determined that there is a lacking portion LP in the first portion PP1 after cutting processing in Step S170 of the three-dimensional shaping process shown in FIG. 8, the controller 500 may advance the process to Step S180 after generating additional shaping data in Step S175 without executing the process of Step S177. Thereafter, shaping data for shaping the second portion PP2 is acquired in Step S110, and by using the shaping data for shaping the second portion PP2 and the additional shaping data for filling the lacking portion LP of the first portion PP1, the lacking portion LP of the first portion PP1 may be filled while shaping the second portion PP2 in Step S115. That is, the step of filling the lacking portion LP of the first portion PP1 with the shaping material may be included in the step of shaping the second portion PP2. In that case, the three-dimensional shaped article OB can be formed with high dimensional accuracy while suppressing prolongation of the three-dimensional shaping process.

(B2) The measuring unit 290 of the three-dimensional shaping apparatus 100 may be configured to be able to measure the shape of the surface and the shape of an inner part of the three-dimensional shaped article OB. For example, the measuring unit 290 may include an ultrasonic sensor for measuring the shape of the inner part of the three-dimensional shaped article OB. In that case, in Step S120 and Step S150 of the three-dimensional shaping process shown in FIG. 8, the shape of the surface and the shape of the inner part of the three-dimensional shaped article OB can be measured, and therefore, a void unintentionally formed in the inner part of the three-dimensional shaped article OB can be specified as the lacking portion LP. When the lacking portion LP was specified in the inner part of the three-dimensional shaped article OB, the controller 500 generates additional cutting data for exposing the lacking portion LP, and after exposing the lacking portion LP by cutting processing, the lacking portion LP is specified again, and additional shaping data of the lacking portion LP are generated, and shaping of the three-dimensional shaped article OB may be performed over again from the middle.

(B3) In at least one of Step S120 and Step S150 of the three-dimensional shaping process shown in FIG. 8, the controller 500 may measure only the shape of a predetermined portion of the three-dimensional shaped article OB using the measuring unit 290. For example, the controller 500 may measure only the shape of a corner part of the three-dimensional shaped article OB using the measuring unit 290. In that case, the measurement using the measuring unit 290 can be efficiently performed, and therefore, the three-dimensional shaped article OB can be shaped with high dimensional accuracy while suppressing prolongation of the three-dimensional shaping process.

(B4) The three-dimensional shaping apparatus 100 may be configured to be able to heat the shaping face 310 of the stage 300. For example, the stage 300 may have a built-in heater that heats the shaping face 310 under the control of the controller 500. The controller 500 may heat the shaping face 310 by the heater prior to the process of Step S115 for shaping the first portion PP1 in the three-dimensional shaping process shown in FIG. 8. In that case, the adhesion degree between the shaping face 310 and the first portion PP1 can be improved, and therefore, the occurrence of a warpage in the first portion PP1 can be suppressed.

(B5) In Step S125 of the three-dimensional shaping process shown in FIG. 8, the controller 500 specifies the lacking portion LP of the first portion PP1 by comparing the shape of a portion corresponding to the first portion PP1 of the thickened shape SP2 represented by the second shape data DT2 with the measured shape SP3 of the first portion PP1 represented by the measured shape data DT3. On the other hand, in Step S125, the controller 500 may specify the lacking portion LP and the excess portion EP of the first portion PP1 by comparing the shape of a portion corresponding to the first portion PP1 of the thickened shape SP2 represented by the second shape data DT2 with the measured shape SP3 of the first portion PP1 represented by the measured shape data DT3. When the excess portion EP was specified, the controller 500 may generate additional cutting data for performing cutting processing for the excess portion EP, acquire cutting data from the data generation portion 501 in Step S140, and perform cutting processing for the specified excess portion EP and the cutting allowance CA using the additional cutting data and the cutting data in Step S145.

C. Other Aspects

The present disclosure is not limited to the above-mentioned embodiments, but may be realized in various aspects without departing from the gist thereof. For example, the present disclosure may also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as essential features in the present specification.

(1) According to a first aspect of the present disclosure, a method for producing a three-dimensional shaped article is provided. This method for producing a three-dimensional shaped article includes a first shaping step of shaping a first portion constituting at least a part of the three-dimensional shaped article by ejecting a molten material obtained by melting a material containing a thermoplastic resin according to shaping data generated based on a shape resulting from adding a cutting allowance for cutting processing to a target shape of the three-dimensional shaped article, a cutting step of performing the cutting processing for the first portion, a measuring step of obtaining a measured shape of the first portion by measuring a shape of the first portion, a specifying step of specifying an excess portion and a lacking portion of the first portion by comparing a shape of a portion corresponding to the first portion of the target shape with the measured shape, an additional cutting step of performing the cutting processing for the specified excess portion when the excess portion was specified, and an additional shaping step of ejecting the molten material so as to fill the specified lacking portion when the lacking portion was specified.

According to the method for producing a three-dimensional shaped article of this aspect, when a lacking portion was specified, the lacking portion is filled with the molten material in the additional shaping step, and when an excess portion was specified, the excess portion is removed in the additional cutting step, and therefore, the lacking portion or the excess portion can be prevented from remaining in the produced three-dimensional shaped article. Accordingly, the three-dimensional shaped article can be produced with high dimensional accuracy.

(2) In the method for producing a three-dimensional shaped article of the above aspect, in the specifying step, the excess portion of the first portion may be specified by comparing a shape of a portion corresponding to the first portion of the target shape with the measured shape, and the lacking portion of the first portion may be specified by comparing a shape of a portion corresponding to the first portion of a shape resulting from adding the cutting allowance to the target shape with the measured shape.

According to the method for producing a three-dimensional shaped article of this aspect, the cutting allowance for performing cutting processing is reliably ensured, and therefore, the three-dimensional shaped article can be produced with high dimensional accuracy.

(3) The method for producing a three-dimensional shaped article of the above aspect may further include a second shaping step of shaping a second portion constituting a part different from the first portion of the three-dimensional shaped article, wherein the additional cutting step and the additional shaping step may be performed between the first shaping step and the second shaping step.

According to the method for producing a three-dimensional shaped article of this aspect, the second portion is shaped after removing the lacking portion and the excess portion from the first portion, and therefore, the lacking portion and the excess portion can be more reliably prevented from remaining in the produced three-dimensional shaped article.

(4) The method for producing a three-dimensional shaped article of the above aspect may further include a second shaping step of shaping a second portion constituting a part different from the first portion of the three-dimensional shaped article, wherein the additional cutting step may be performed between the first shaping step and the second shaping step, the additional shaping step may be included in the second shaping step, and in the second shaping step, the second portion may be shaped and also the lacking portion of the first portion may be filled.

According to the method for producing a three-dimensional shaped article of this aspect, the lacking portion of the first portion can be filled with the molten material when the second portion is shaped. Therefore, the three-dimensional shaped article can be produced with high dimensional accuracy while suppressing prolongation of the production of the three-dimensional shaped article.

(5) In the method for producing a three-dimensional shaped article of the above aspect, in the measuring step, a shape of a surface and an inner part of the first portion may be measured.

According to the method for producing a three-dimensional shaped article of this aspect, a void formed in the inner part of the three-dimensional shaped article can be specified as the lacking portion, and therefore, the unintentional occurrence of a void in the inner part of the three-dimensional shaped article can be suppressed.

(6) In the method for producing a three-dimensional shaped article of the above aspect, in the measuring step, a shape of a predetermined portion of the first portion may be measured.

According to the method for producing a three-dimensional shaped article of this aspect, the measuring step can be efficiently performed, and therefore, the three-dimensional shaped article can be shaped with high dimensional accuracy while suppressing prolongation of the production of the three-dimensional shaped article.

(7) According to a second aspect of the present disclosure, a three-dimensional shaping apparatus is provided. The three-dimensional shaping apparatus includes a shaping portion that ejects a molten material obtained by melting a material containing a thermoplastic resin to a stage, a cutting portion having a cutting tool, a measuring portion that measures a shape of the molten material stacked on the stage, and a controller that controls the shaping portion, the cutting portion, and the measuring portion. The controller executes a shaping process for shaping a first portion constituting at least a part of a three-dimensional shaped article by ejecting the molten material from the shaping portion according to shaping data generated based on a shape resulting from adding a cutting allowance for cutting processing to a target shape of the three-dimensional shaped article, a cutting process for performing the cutting processing for the first portion using the cutting portion, a measuring process for obtaining a measured shape of the first portion by measuring a shape of the first portion using the measuring portion, a specifying process for specifying an excess portion and a lacking portion of the first portion by comparing a shape of a portion corresponding to the first portion of the target shape with the measured shape, an additional cutting process for performing the cutting processing for the specified excess portion using the cutting portion when the excess portion was specified, and an additional shaping process for ejecting the molten material from the shaping portion so as to fill the specified lacking portion when the lacking portion was specified.

According to the three-dimensional shaping apparatus of this aspect, when a lacking portion was specified, the controller fills the lacking portion with the molten material in the additional shaping process, and when an excess portion was specified, the controller removes the excess portion in the additional cutting process, and therefore, the lacking portion or the excess portion can be prevented from remaining in the produced three-dimensional shaped article. Accordingly, the three-dimensional shaped article can be produced with high dimensional accuracy.

The present disclosure can also be realized in various aspects other than the method for producing a three-dimensional shaped article. For example, it can be realized in aspects of a three-dimensional shaping apparatus, a method for controlling a three-dimensional shaping apparatus, and the like.

What is claimed is:

1. A method for producing a three-dimensional shaped article, comprising:
   a first shaping step of shaping a first portion constituting a part of the three-dimensional shaped article, and less than an entire three-dimensional shaped article, by ejecting from a nozzle a molten material obtained by melting a material containing a thermoplastic resin according to shaping data generated based on a shape resulting from adding a cutting allowance for cutting processing to a target shape of the three-dimensional shaped article;
   a cutting step of performing the cutting processing for the first portion;
   a measuring step of obtaining a measured shape of the first portion by measuring a shape of the first portion;
   following the measuring step, a specifying step of comparing the measured shape with a shape of a portion corresponding to the first portion of the target shape and specifying a lacking portion of the first portion, the lacking portion being a portion represented by the shape of the portion corresponding to the first portion of the target shape and not represented by the measured shape of the first portion;
   a step of generating lacking portion shaping data for the lacking portion and ejecting the molten material to the lacking portion of the first portion to fill the specified lacking portion based upon the lacking portion shaping data;
   a step of reheating an upper face of the first portion; and
   following the reheating, a second shaping step of shaping a second portion on the upper face of the first portion, the second portion constituting a part different from the first portion of the three-dimensional shaped article.

2. The method for producing a three-dimensional shaped article according to claim 1, wherein in the measuring step, a shape of a surface and an inner part of the first portion is measured.

3. The method for producing a three-dimensional shaped article according to claim 2, when the lacking portion is specified in the inner part of the first portion, cutting the first portion for exposing the lacking portion prior to ejecting the molten material to the first portion to fill the specified lacking portion.

4. The method for producing a three-dimensional shaped article according to claim 1, wherein in the measuring step, a shape of a predetermined portion of the first portion is measured.

5. The method for producing a three-dimensional shaped article according to claim 1, wherein the specifying step further comprises:
   comparing the measured shape with the shape of another portion corresponding to the first portion of the target shape and specifying the another portion as an excess portion.

6. The method for producing a three-dimensional shaped article according to claim 5, wherein when the excess portion is specified, an additional cutting step to the first portion of performing the cutting processing for the specified excess portion to remove the excess portion.

7. The method for producing a three-dimensional shaped article according to claim 6, wherein in the specifying step,
   the excess portion of the first portion is specified by comparing a shape of a portion corresponding to the first portion of the target shape with the measured shape, and
   the lacking portion of the first portion is specified by comparing a shape of a portion corresponding to the first portion of a shape resulting from adding the cutting allowance to the target shape with the measured shape.

8. The method for producing a three-dimensional shaped article according to claim 6, wherein the additional cutting step and the step of ejecting the molten material are performed between the first shaping step and the second shaping step.

9. The method for producing a three-dimensional shaped article according to claim 6, wherein
the additional cutting step is performed between the first shaping step and the second shaping step,
the step of ejecting the molten material is included in the second shaping step, and
in the second shaping step, the second portion is shaped and also the lacking portion of the first portion is filled according to the shaping data and the lacking portion shaping data.

10. The method for producing a three-dimensional shaped article according to claim 6, wherein specifying the lacking portion of the first portion is performed prior to specifying the excess portion of the first portion.

11. The method for producing a three-dimensional shaped article according to claim 1, wherein in the step of reheating, reheating the upper face of the first portion by a heater, changing a position of the heater so that the heater is positioned forward in a direction of movement of the nozzle relative to a stage.

12. The method for producing a three-dimensional shaped article according to claim 11, wherein the position of the heater is changed by a rotating mechanism, the rotating mechanism having a rail surrounding an outer circumference of the nozzle, and a support member that supports the heater.

13. The method for producing a three-dimensional shaped article according to claim 1, wherein in the ejecting the molten material to the lacking portion of the first portion, ejecting the molten material to the lacking portion of the first portion having a size larger than a predetermined size.

14. A three-dimensional shaping apparatus, comprising
a shaping portion that ejects a molten material obtained by melting a material containing a thermoplastic resin to a stage;
a cutting portion having a cutting tool;
a measuring portion that measures a shape of the molten material stacked on the stage;
and a controller that controls the shaping portion, the cutting portion, and the measuring portion, wherein
the controller executes
a first shaping process of shaping a first portion constituting a part of the three-dimensional shaped article, and less than an entire three-dimensional shaped article, by ejecting from a nozzle molten material obtained by melting a material containing a thermoplastic resin according to shaping data generated based on a shape resulting from adding a cutting allowance for cutting processing to a target shape of the three-dimensional shaped;
a cutting process of performing the cutting processing of the first portion;
a measuring process of obtaining a measured shape of the first portion by measuring a shape of the first portion;
following the measuring process, a specifying step of comparing the measured shape with a shape of a portion corresponding to a first portion of the target shape and specifying a lacking portion of the first portion, the lacking portion being a portion represented by the shape of the portion corresponding to the first portion of the target shape and not represented by the measured shape of the first portion;
a process of generating lacking portion shaping data for the lacking portion and ejecting the molten material to the lacking portion of the first portion to fill the specified lacking portion based upon the lacking portion shaping data;
a process of reheating an upper face of the first portion; and
following the reheating, a second shaping process of shaping a second portion on the upper face of the first portion, the second portion constituting a part different from the first portion of the three-dimensional shaped article.

* * * * *